US012460523B2

(12) United States Patent
Bannister et al.

(10) Patent No.: US 12,460,523 B2
(45) **Date of Patent: *Nov. 4, 2025**

(54) SYSTEM AND METHOD FOR ENHANCED PETROLEUM PRODUCT RECOVERY

(71) Applicant: LION FUEL RESOURCES, LLC, Oklahoma City, OK (US)

(72) Inventors: Frank Bannister, Oklahoma City, OK (US); Paul Trost, Oklahoma City, OK (US); William Hodges, Oklahoma City, OK (US); Fred Varani, Oklahoma City, OK (US)

(73) Assignee: Lion Fuel Resources, LLC, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,662

(22) Filed: May 12, 2024

(65) Prior Publication Data

US 2024/0301776 A1 Sep. 12, 2024

Related U.S. Application Data

(63) Continuation of application No. 17/528,072, filed on Nov. 16, 2021, now Pat. No. 11,982,165.

(51) Int. Cl.
*E21B 43/16* (2006.01)
*C01B 3/02* (2006.01)

(52) U.S. Cl.
CPC .............. *E21B 43/164* (2013.01); *C01B 3/02* (2013.01); *C01B 2203/0283* (2013.01); *C01B 2203/042* (2013.01); *C01B 2203/84* (2013.01); *C01B 2203/86* (2013.01); *Y02E 20/12* (2013.01); *Y02E 20/30* (2013.01)

(58) Field of Classification Search
None
See application file for complete search history.

(56) References Cited

U.S. PATENT DOCUMENTS 4,557,330 A 12/1985 Fussell et al.
9,553,321 B2 1/2017 Berlowitz et al.
(Continued)

*Primary Examiner* — Andrew Sue-Ako
(74) *Attorney, Agent, or Firm* — Patent Engineering, LLC; Stephen B. Katsaros

(57) ABSTRACT

A system for producing CO and CO2 to achieve an efficient oil recovery operation that minimizes undesirable gaseous emissions is provided. The system includes a portable CO-producing device, a portable CO2-producing device located proximate to the reservoir, and a gas collecting device configured to receive CO and CO2 and selectively distribute a desired ratio of CO and CO2 dynamically based on current reservoir conditions. Producing CO2 proximate to the reservoir comprises reforming carbon-based fuel within oxygen. Electrical energy generated is used to selectively distribute the desired ratio of CO/CO2 to the reservoir with de minimis greenhouse gases produced transmitted into the atmosphere. The system is an energy-efficient arrangement that recycles and reuses by-products and unused products from the process. Greenhouse gas emissions are significantly reduced compared to conventional processes by-products are fully utilized. Hydrogen produced can be used to generate electricity, as can heat generated from other sources within the process.

31 Claims, 8 Drawing Sheets

(56) References Cited

U.S. PATENT DOCUMENTS

| | | | |
|---|---|---|---|
| 9,951,594 | B2 | 4/2018 | Trost et al. |
| 10,014,541 | B2 | 7/2018 | Jamal et al. |
| 10,316,631 | B2 | 6/2019 | Trost |
| 10,329,149 | B2 | 6/2019 | Manousiouthakis et al. |
| 10,876,384 | B2 | 12/2020 | Trost |
| 11,982,165 | B2 * | 5/2024 | Bannister .................. C01B 3/48 |
| 2010/0200229 | A1 | 8/2010 | Jefferd |
| 2010/0224363 | A1 * | 9/2010 | Anderson ............. F22B 1/1853 166/266 |
| 2010/0314136 | A1 | 12/2010 | Zubrin et al. |
| 2010/0318337 | A1 * | 12/2010 | Bailey ................. E21B 41/0064 703/10 |
| 2012/0039430 | A1 | 2/2012 | Abel |
| 2014/0216011 | A1 | 8/2014 | Muthaiah et al. |
| 2018/0202272 | A1 | 7/2018 | Trost |
| 2020/0317513 | A1 | 10/2020 | Arkadakskiy et al. |

* cited by examiner

SYSTEM AND METHOD FOR ENHANCED PETROLEUM PRODUCT RECOVERY

CROSS REFERENCE TO RELATED APPLICATION

The present application is a continuation and claims priority to U.S. application Ser. No. 17/528,072 entitled SYSTEM AND METHOD FOR ENHANCED PETROLEUM PRODUCT RECOVERY, filed on Nov. 16, 2021 by Bannister et al. The entirety of the aforementioned application is incorporated herein by reference for all purposes.

TECHNICAL FIELD

The present invention relates generally to petroleum product recovery, and more particularly to a system and method for efficient on-site production of necessary gases required to achieve improved petroleum product recovery.

BACKGROUND

Oil and gas recovery has seen ongoing improvements over the last decade. Different substances are employed to obtain oil and gas from a site. Previous designs have employed drilling wells as well as fracking, which employs injecting liquids into the ground. Wells can be expensive and time-consuming and amounts of oil and gas can remain in the reservoir, which is undesirable. Disposal of water flowing back after fracking can cause seismic events.

Certain newer designs have been employed or suggested. One such design is reflected in U.S. Pat. Nos. 9,951,594, 10,316,631, and 10,876,384, all naming inventor Paul Trost. These references discuss the use of various gases, notably carbon monoxide in some instances with carbon dioxide. However, production and efficient distribution of these gases can be difficult or impossible. Such gases being available in the quantities required can mandate shipment from offsite, which is time consuming and expensive.

Further, certain types of oil-bearing formations can inhibit yield if such gases are provided in inadequate quantities or proportions.

Existing oil and gas recovery systems tend to entail significant amounts of fixed equipment as well as energy to operate and create significant amounts of pollution, including but not limited to carbon dioxide emissions. Such emissions are undesirable.

Additionally, acquisition and or production of carbon monoxide and carbon dioxide in acceptable proportions can be difficult in field applications. Although both CO and CO2 are generally available in limited quantities, these gases can be expensive and present significant transportation issues. For the large volumes of gases required for any gaseous enhanced oil recovery process, a local source of the gas(es) is required.

Further, certain conditions in underground reservoirs may inhibit yield if such gases are provided in inadequate quantities or proportions. As a consequence of the practical unavailability of the required gases, with the exception of certain very large projects, a vast amount of otherwise recoverable oil lies stranded in smaller and mid-sized fields not located near existing gas supplies.

Current tertiary oil and gas recovery systems require energy and fixed equipment to operate, creating large volumes of pollutants, including but not limited to carbon dioxide emissions. Such emissions are undesirable.

It would therefore be desirable to provide a system and method of efficiently increasing yield of petroleum product that is relatively easy to install and operate, operates efficiently with minimal or no or virtually no emissions or pollution, and addresses issues associated with previous designs.

SUMMARY

According to one aspect of the present design, there is provided a method for producing carbon dioxide proximate a petroleum product reservoir, comprising reforming carbon-based fuel within oxygen using a carbon-based fuel reforming apparatus, wherein said reforming produces heat, and selectively distributing a desired ratio of carbon dioxide and carbon monoxide to the petroleum product reservoir using electrical energy generated from the heat produced from said reforming. The carbon-based fuel reforming apparatus emits de minimis total greenhouse gases to atmosphere.

According to another embodiment of the present design, there is provided a method for producing carbon dioxide proximate a petroleum product reservoir. The method comprises reforming carbon-based fuel within oxygen using a carbon based fuel reforming apparatus and using electrical energy generated from heat produced from said reforming to selectively distribute a desired ratio of carbon dioxide and carbon monoxide to the petroleum product reservoir with de minimis total greenhouse gases produced transmitted to atmosphere.

According to another aspect of the present design, there is provided a method for extracting petroleum products from a petroleum product reservoir, comprising producing carbon monoxide proximate to the petroleum product reservoir, producing carbon dioxide proximate to the petroleum product reservoir, and selectively distributing a desired ratio of carbon dioxide and carbon monoxide dynamically based on current petroleum product reservoir conditions to the petroleum product reservoir.

According to a further aspect of the present design, there is provided a system for extracting petroleum products from a petroleum product reservoir. The system comprises a portable carbon monoxide producing device located proximate to the petroleum product reservoir, a portable carbon dioxide producing device located proximate to the petroleum product reservoir, and a gas collecting device configured to receive carbon dioxide from the carbon dioxide producing device and carbon monoxide from the carbon monoxide producing device and selectively distribute a desired ratio of carbon dioxide and carbon monoxide dynamically based on current petroleum product reservoir conditions to the petroleum product reservoir. The portable carbon dioxide producing device is configured to combust carbon-based fuel within oxygen to produce heat that the system converts to electrical energy and uses to selectively distribute the desired ratio of carbon dioxide and carbon monoxide to the petroleum product reservoir with de minimis greenhouse gases produced transmitted to atmosphere.

The system of the present design is green, energy efficient arrangement that recycles and reuses by-products and unused products from the process. Gas emissions are reduced compared to conventional processes, and gases and other by-products are fully utilized rather than flared. For example, hydrogen produced as a by-product with the CO2 and the CO can be used to generate electricity, as can heat from other sources in the process.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures.

Figure 1:
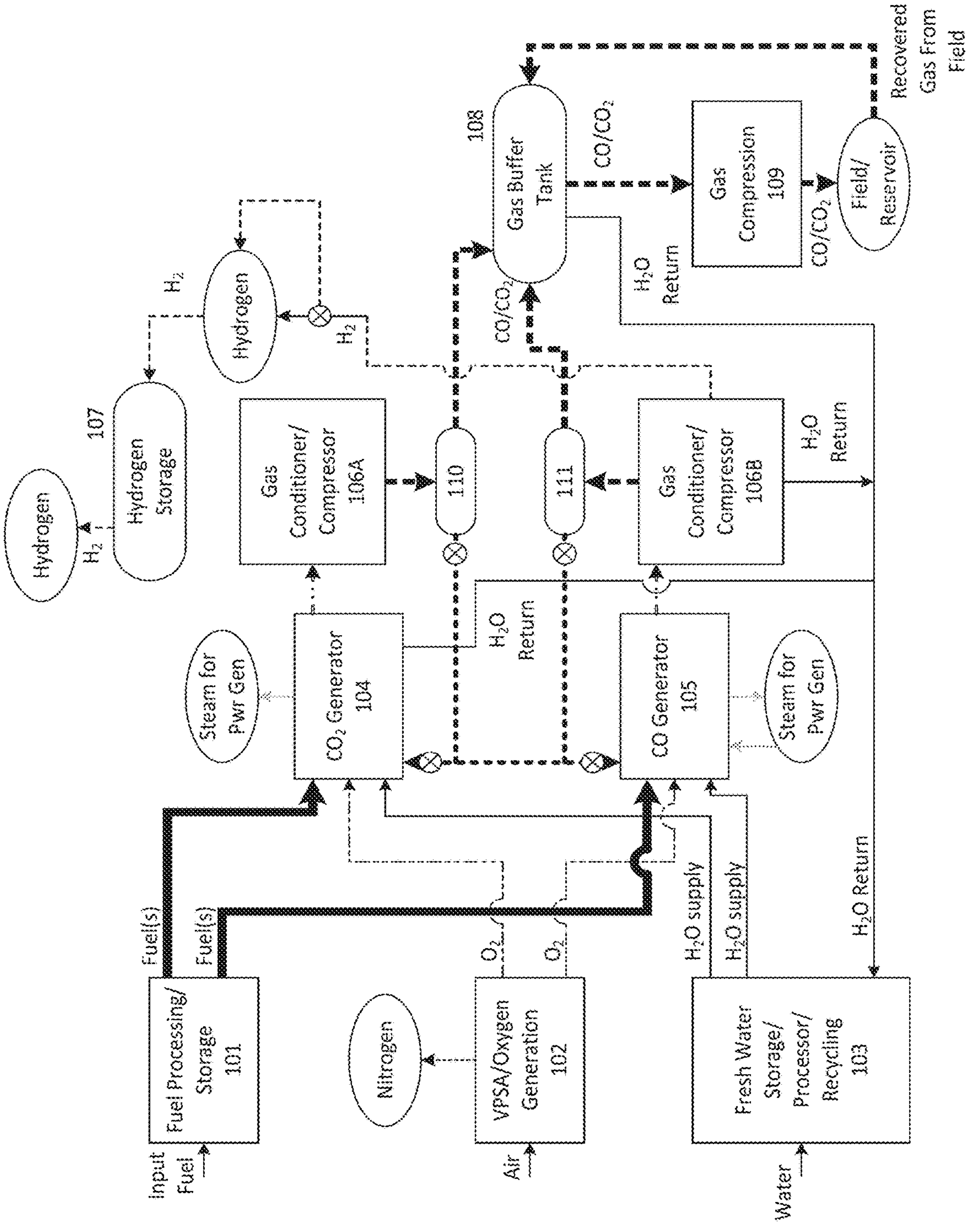
FIG. 1 is a general representation of a first embodiment of the present design.

The exemplification set out herein illustrates particular embodiments, and such exemplification is not intended to be construed as limiting in any manner.

DETAILED DESCRIPTION

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

In general, the present invention includes an arrangement of components including a relatively portable carbon monoxide and carbon dioxide producing arrangement that can be readily deployed to a reservoir site and a control mechanism that varies the gases provided to the reservoir.

The system of the present design is green, energy-efficient arrangement that recycles and reuses by-products and unused products from the process. Gas emissions are reduced compared to conventional processes, and gases and other by-products are fully utilized rather than flared. For example, hydrogen produced as a by-product with CO2 and CO can be used to generate electricity, as can heat from other sources in the process. The present design not only recovers petroleum products but also provides heat of combustion energy suitable for conversion into electrical energy having zero or de minimis emissions due to said produced gases being injected, recycled, and ultimately sequestered into a reservoir.

The disclosures of U.S. Pat. Nos. 9,951,594, 10,316,631, and 10,876,384, all naming inventor Paul Trost, are hereby incorporated by reference. As used herein, terms such as "carbon-based fuel" or "hydrocarbon fuel" are intended broadly to mean any carbonaceous fuel, including but not limited to biomass, coals, and any petroleum-based products from natural gas to petroleum coke. Also, as used herein, the term "petroleum product" is also intended broadly to mean any form of fossil fuel plus any associated products, including but not limited to oil and natural gas. Potential fuels in the context of the present design may include but are not limited to any carbonaceous or hydrocarbon-based fuel, including but not limited to biomass, coal, petroleum coke, natural gas, and products derived therefrom, as well as any liquid hydrocarbon products.

Use of Carbon Monoxide and Carbon Dioxide

Carbon monoxide increases oil flow and the rate of oil flow from the oil reservoir through various chemical mechanisms. Carbon monoxide reduces corrosion in oilfield tubulars due to the formation of a reduced iron species coating on previously oxidized areas. Benefits of having Carbon monoxide (CO) in the reservoir or well bore include the CO molecule having a very small diameter that facilitates infiltration of the CO into zones in the reservoir having lower permeability but higher residual oil saturation to help repressurize such zones, low solubility in water facilitating the migration of the CO to areas of the reservoir having low permeability but high residual oil saturation, as well as lowering the Interfacial Tension (IFT) between oil and water, allowing spherical oil droplets to change shape into elongated "worm-type" shapes whose smaller diameters can migrate with the water through smaller pore throats to the producing well. Additionally, electron distribution of the CO molecule is similar to certain crude oil molecules, such as asphaltenes, allowing the CO to mobilize the asphaltenes out of the pore throat and facilitating migration of oil droplets through the now-open pore throat to the production well (thus providing a higher rate of oil production). CO also increases oil production rates by increasing the reservoir (matrix) permeability due to its reaction with certain ferric oxide and hydroxide species prevalent in certain reservoir minerals. Such reactions reduce the ferric oxide and hydroxides to ferrous oxides and liberate the bound water attached to the matrix, thereby shrinking the molecular diameters of the iron species and increasing the pore throats and matrix permeability.

CO has lower (e.g., limited) solubility in paraffinic hydrocarbons but higher solubility in aromatic hydrocarbons such as benzene, toluene, ethylbenzene, and asphaltenes. CO is a very good reducing agent and oxidizes to carbon dioxide (CO2). The molecular diameter of CO is 112.8 pm as compared to CO2 at 232 pm. The smaller molecular diameter of CO results in a faster rate of movement into and through many natural materials such as water, hydrocarbons and oil/gas reservoirs.

CO has a critical temperature point of 132 degrees K (−222 degrees F.), and the critical pressure for CO is 34 atm (476 psi). Thus, contrary to $CO_2$, achieving the critical point for CO under natural reservoir conditions is unlikely. However, this low critical point can be beneficial for the recovery of oil under immiscible conditions. CO's solubility in paraffinic, aromatic, and asphaltene hydrocarbons at reservoir pressures, common to oilfield applications, may be beneficial for all types of oil recovery operations.

Further, the strong reducing nature of CO could be beneficial in oil recovery operations from reservoirs that have significant iron-bearing minerals (clays), chlorite, glauconite, iron-bearing limestones and dolomites, and iron compounds adsorbed or absorbed onto the mineral surfaces. Typically, the reducing nature of the CO on iron hydroxides and oxides results in a reduction in valence state from +3 to +2 valance state. Carbon monoxide can be helpful with known problems, such as the acidization of limestone reservoirs when iron is present. The beneficial reactions of carbon monoxide resulting in a reduction of valance state on iron-containing minerals and rocks can result in a stabilization of clays, an increase in the reservoir matrix permeability, a minimization of iron migration and its subsequent plugging of the reservoir rock during acidification of iron-bearing limestone and dolomites.

Also due to the strong reducing nature of the CO when in the presence of ferric ions, the CO, whether alone or in a mixture with $CO_2$ and/or with other gases and/or other anti-corrosive agents, can mitigate the corrosive effects of $CO_2$ and water on oilfield tubulars (e.g., pipes). $CO_2$ with water (e.g., either water entrained with the $CO_2$ or water present in the reservoir) forms carbonic acid, thus oxidizing (rusting) the oilfield tubulars by forming ferric +3 oxides and hydroxides. The reducing nature of the CO causes reduction of the oxidized (rusted) oilfield tubulars to a ferrous +2 oxide compound that coats the tubular protecting it from further oxidation.

Due to the small diameter of the CO molecule, coupled with its unique electron cloud configuration, CO injected into a reservoir moves through the reservoir rock, the oil, and the water at a fast rate. Due to its solubility in oils, especially those oils containing aromatic hydrocarbons such as benzene, naphthalenes, and/or asphaltenes, even at low pressures, (typically less than the Minimum Miscibility Point of $CO_2$ in the reservoir oil), the rate of oil production to the producing well increases. Addition of CO can occur either in a pure CO form, or in a gas mixture of CO with hydrocarbon and/or non-hydrocarbon gases. For example, for numerous applications, the CO can be as a mixture primarily containing $CO_2$ and CO, or as a mixture of gases containing CO, $CO_2$, and other gases such as $N_2$, $CH_4$, or as a mixture of gases containing CO and $H_2$, optionally with minor amounts of any of $CO_2$, methane, ethane, propane, butane, or pentane, for example. Water vapor may be present as a minor component of any of the gas mixtures.

One method for the use of CO is the injection of the CO in concentrations and with or without other associated gases into a reservoir, such as those having iron-containing minerals. Such injection may be performed with the reservoir at a natural temperature or unheated state, for example, by fire flooding or other exothermic reactions in the reservoir. In iron-containing reservoirs, acidizing, fracking, and water injection can result in the formation of highly hydrated iron hydroxides and oxides that then form gels. Such gels can migrate and block the channel ways for the transmission of gas and oil and water through the reservoir and pore throats, thus severely diminishing or even stopping oil, gas and/or water recovery. The reducing nature of CO may be used to treat such reservoirs and remove the hydrated iron species or iron gels resulting from the reduction of the iron to a less or non-hydroscopic form of iron. The less hydroscopic, reduced form of iron is of a much smaller diameter and results in the re-opening of the pore throats, thereby allowing reservoir fluid movement back to the producing well. For example, ferric oxides, ferric hydroxides, and other highly hydrated Fe+3 species of iron oxide(s) may be reduced to Fe+2 iron oxides such as the mineral "wustite" (FeO), a relatively small molecule. Fe+2 iron is thermodynamically favored over Fe+3 when ferric oxides and/or hydroxides encounter CO.

Another method comprises aiding oil and gas recovery from shale oil and gas reservoirs or other reservoirs that have extremely low inherent permeability in the ranges of micro to nano-darcy permeability. Such reservoirs typically contain various concentrations of iron-bearing clay minerals. The reducing nature of the CO or a mixture of gases containing CO increases matrix permeability. Such an increase has been demonstrated by linear core flooding experiments and also by packed column testing.

Field application of CO injected in reservoirs damaged by iron-bearing clays, minerals, and the presence of hydrated ferric iron hydroxides and oxides can thus be repaired and increased oil production may be achieved, as exemplified by Darcy's law, where an increase in permeability is proportionately related to an increase in oil production.

Another application of CO to increase oil recovery is the addition of the CO, or the addition of a $CO/CO_2$ mixed gas, or a combination of $CO_2$, CO and $N_2$ mixed gas into a frac fluid such as water or carbon dioxide. Benefits of the addition of CO, or mixed gas containing CO, are minimizing water imbibing onto the frac face, formation of increased reservoir matrix permeability adjacent to the frac face, lowering the interfacial tension between the reservoir's oil and frac face water, stabilizing the reservoir's clays, minimizing the deleterious effects of any iron oxides and hydroxides and achieving a faster oil recovery plus a higher volume of total oil recovered.

A further application of the CO or CO-containing mixed gas is in secondary (water flooding) recovery operations. Introduction of CO, or CO-containing mixed gas, into the water flood may result in the lowering of the interfacial tension between the water and oil, changing the wettability of the reservoir rock, shrinking water-sensitive clays and associated iron hydroxides and oxides, protecting the tubulars against corrosion, and achieving faster oil recovery at water flood pressures after the water flood has essentially reached its economic limits. All of these benefits can occur under immiscible conditions. Alternately, CO may be injected, with or without other associated gases, into existing or planned tertiary (EOR) oil recovery projects utilizing chemicals, such as the APS-(alkaline, polymer, surfactant) chemical floods, and/or into steam floods and carbon dioxide floods. The benefit of an APS chemical flood for enhanced oil recovery is to minimize the adsorption of the APS chemicals on minerals having iron compounds on their surfaces. Such minerals could be, but are not limited to, iron bearing minerals and compounds, pyroxenes, amphiboles, sulfides and glauconites. Addition of CO, or CO in a mixture of gases, to a steam flood is also beneficial. Such steam floods target very viscous, high molecular weight crude oils where the oil gravity ranges from 9-19° API, reservoir temperatures are 40°-90° F., viscosities are 1,000 to greater than 10,000 cp, and reservoir pressures vary from 10-2000 psi. Although the steam has a temperature of about 212° F., and more in some implementations, the resulting reservoir temperature may be above 212° F. but typically still remains less than about 250° F. Heavy oil deposits typically are associated with iron-bearing clayey sandstones, with the clay being montmorillonite, illite, smectite, chlorite and/or glauconite, all of which have significant iron hydroxide content. As the steam encounters these swelling clays, the reservoir permeability can be greatly reduced. However, the presence of CO can alleviate this loss of permeability and its corresponding loss of production of oil.

Another benefit of CO in the recovery of heavy oils is the mobilization of the asphaltenes, multi-ring aromatic hydrocarbons commonly present in heavy oils. CO can bind to the asphaltene and liberate or desorb the adsorbed or absorbed high molecular weight paraffins, resins, and/or kerogens. Such desorption would significantly decrease the effective molecular diameter of the asphaltenes allowing the asphaltenes to migrate through the reservoir and to the well bore.

Further, with respect to steam flooding, high quality steam may be injected into the reservoir, increasing oil recovery by lowering the viscosity of crude oil while simultaneously increasing the reservoir pressure, thus facilitating movement of the less viscous oil through the reservoir. With the introduction of CO or a CO mixed gas into the steam, the chemical benefits of the CO, such as its solubility in the crude oil, solubility in asphaltenes, and the lowering of the Inter Facial Tension between the crude oil and the water phase, coupled with the small diameter of the CO, results in an increased combined physical and chemical recovery of the crude oil. Such a combined process may, therefore, achieve both a faster rate of oil production coupled with a greater amount of total oil recovered.

CO can be mixed with $CO_2$ to aid heavy oil recovery from reservoirs that are not steamed. Such a cold, heavy oil recovery process, conventionally known as "CHOPS" in the oil industry, can be beneficial. One of the processes hindering cold heavy oil recovery is the presence of asphaltenes; these multi-ring aromatic hydrocarbons can plug the oil reservoir, limiting oil recovery. Such plugging is often the result of deposition, adsorption, and changes in the wettability of the reservoir rock, all of which inhibit oil recovery. Plugging can also occur in the wellbore tubular with subsequent buildup of both paraffinic and multi-ring aromatic asphaltenes. With the interaction of CO with asphaltenes, plugging may be reduced and the cost of oil production reduced.

Concentrations of CO injected can range from greater than 3-99.99+ percent and can be injected with any number of other gases, including but not limited to $CO_2$, $N_2$, air, and steam, but not limited to these gases. The CO concentrations typically vary based on reservoir clay content, iron oxide/hydroxide content, and the individual oil's interaction with the CO relative to lowering the Interfacial Tension and the solubility of CO in hydrocarbons. In general, the CO concentration being introduced into another gas or liquid system varies from 3-40 percent by volume.

Depending on the phase (primary, secondary, or tertiary) of oil/gas recovery operations, the chemical and mineralogical nature of the reservoir rocks, and the intended purpose to be achieved, the concentrations of the CO and the method of presentation to the reservoir may vary. For example, essentially pure CO may be the desired form of presentation. However, for other applications, CO in a mixture with $CO_2$ or, alternately, CO in a mixture with $CO_2$, $N_2$ and/or $N_2$, $CO_2$, CO in a mixture with $N_2$, or CO mixed with other gases such as, e.g., $CH_4$, may be more advantageous based on the specific application.

Discussions of variable reservoir conditions, phase of hydrocarbon recovery operations and reservoir mineralogy and geochemistry are thus discussed below.

In wellbore remediation, formation damage occurs due to introduction of fresh water into a water-sensitive formation containing smectite, illite, montmorillonite, bentonite, chlorite, ferric hydroxides and oxides, or glauconite. In addition, the formation of hydrated iron hydroxides, during the acidization of carbonate reservoirs, can also result in formation damage and plugging of the pore throats (loss of permeability). Injection of CO, either alone or as a gas mixture containing CO, into the well bore increases the permeability of the well bore by increasing the diameter of the pore throats, such as by shrinkage of swelling clays and other minerals.

CO reacts with the ferric hydroxide, which is hydrated, to reduce it to ferrous oxide and/or elemental iron, depending on specific reservoir chemistry. Both of these molecules are much smaller in diameter and less water-sensitive than ferric hydroxide. Water is thus liberated and the pore throats are opened, thus increasing the matrix permeability of the well bore and allowing increased oil recovery and/or a faster rate of oil recovery.

Alternately or additionally, the presence of CO may serve to shrink the swelling clays due to the loss of adsorbed water between layers of clay. Due to the unique chemical interaction of CO and $CO_2$, the rate of solubilization of a mixture of CO and $CO_2$ far exceeds the rate of solubilization of either pure CO or pure $CO_2$ in various applicable circumstances.

In primary oil recovery operations, such as fracking, the introduction of pure CO or a mixture of CO and $CO_2$ can flush oil from porosity and pore throats around a well bore to allow for an extended, larger radius, more permeable well bore. For example, a 7-inch wellbore results in decreased flow as oil approaches wellbore due to small radius. Increasing the radius to 2-4 feet allows more oil to more rapidly migrate to the well bore. If the reservoir contains water-sensitive clays, the reaction with the CO increases the matrix permeability.

Introduction of CO, as pure CO or as a CO and $CO_2$ mixed gas, into the frac fluids provides lower IFT at the frac face, providing improved oil migration through the water wet frac face, minimizes inhibition of water at the frac face, and infiltration of CO into the matrix reservoir rock forms a dendritic pattern in the shale that acts to feed the frac face with oil at a greater rate. A mixture of CO and CO2, or CO alone, may change the wettability of the reservoir, thus achieving greater oil recovery depending on reservoir mineralogy and geochemistry.

One beneficial range of concentration of the CO is generally 3-100 percent depending on the mineralogy of the reservoir rock, the intended purposes of the application, and local reservoir conditions, including reservoir temperature. This beneficial range of concentration of the CO is particularly suited for reservoirs in a natural or unheated state, known in the field of petroleum engineering and oilfield operations to be in the range of 50° F. to 250° F.

Secondary oil recovery operations, such as waterflood operations, include water flooding operations that occur after primary oil recovery is deemed economically infeasible for recovery of an additional 10-25 percent of the residual oil in the reservoir. As water moves through the reservoir rock more easily than oil, the water flood also reaches its economic limit when the ratio of water produced to oil produced is very large. At this point, the introduction of a mixture of CO and $CO_2$ can achieve a greater percentage of oil per barrel of water produced.

The mixture of CO and $CO_2$ recovers more oil at low pressures even after waterflooding has occurred and the reservoir has reached economic limits. CO lowers the Interfacial Tension (IFT) of the oil in the water, enabling an oil droplet to turn into a worm-like configuration and thereby migrate through smaller pore throats, plus the oil is more readily drawn with the water to the wellbore. CO increases reservoir permeability if hydrated ferric hydroxides are present, and the mixture of CO and $CO_2$ requires less injected gas than an injection of pure $CO_2$. CO may change the wettability of the reservoir depending on reservoir mineralogy and geochemistry, and the range of gases in a mixture may be, in one embodiment, CO at 10-60 percent and $CO_2$ at 40-90 percent.

Tertiary oil recovery in this situation entails injection of CO, either as a combination of CO and $CO_2$ or a mixture of CO, $CO_2$, $N_2$, $H_2O$, and trace gases such as $CH_4$ and/or $H_2S$, into the reservoir. Faster oil recovery is achieved at lower pressures and at significantly less volumes of gas injected per barrel of oil produced than pure $CO_2$. CO increases reservoir permeability if hydrated ferric hydroxides are present, and the small diameter of CO as compared to $CO_2$ allows faster migration of the CO through the reservoir and associated oil and, thus, faster oil production. Solubility of the CO in both paraffinic and aromatic hydrocarbons at low pressures results in faster oil recovery at pressures typically well below pressures required by $CO_2$ recovery of the same oil. CO is less soluble in water than $CO_2$ and enters the hydrocarbon phase, facilitating oil recovery.

The range of concentrations for tertiary oil recovery for CO can be between 10 percent and 60 percent, and for $CO_2$, between 40 percent and 90 percent. This wide range is due to the reservoir mineralogy and geochemistry, particularly if iron-bearing minerals or compounds are present that react with the CO, requiring a higher ratio of CO as compared to a reservoir having no reactive iron-bearing minerals or compounds present.

Tertiary steam flood recovery operations suffer from high operating costs due to the heavy, viscous nature of the oil, making it less economically viable. Certain heavy oil reservoirs requiring steam flooding to recover the oil may have swelling clays such as bentonite, illite, montmorillonite, and smectite or other iron-bearing minerals such as chlorite, glauconite, and ferric oxides and hydroxides that swell in the presence of fresh water and steam. Such swelling minerals prohibit the infiltration of the steam into portions of the reservoir. The presence of the CO, either as a single gas or as a gas mixture as discussed, mitigates this adverse effect of clay and mineral swelling by reacting with the ferric hydroxides and oxides to produce a reduction in valence states of the iron to elemental iron or to ferrous oxides, which are not generally hydroscopic and thus are much smaller in diameter. This reduction in diameter thus results in an increase in reservoir permeability, thereby allowing the injection of the steam into these damaged portions of the reservoir. Steam flooding alone only achieves the viscosity reduction due to temperature rise and pressurization of the reservoir. CO or a mixture of CO and $CO_2$ are as a result beneficial in achieving greater oil recovery due to increasing permeability, solubility of CO in the heavy, viscous oils, CO being fairly soluble in aromatics coupled with a mobilization and lowering of viscosity of asphaltenes, lowering IFT, and protecting tubular goods from corrosion.

For tertiary oil recovery, suitable concentrations of CO may be between 10 percent and 60 percent with $CO_2$ between 40 percent and 90 percent. Exact values depend on reservoir mineralogy and concentrations of asphaltenes in the crude oil, especially if iron bearing minerals or compounds are present that would react with the CO thus requiring a higher ratio of CO as compared to a reservoir that has no reactive iron-bearing minerals or compounds present.

Oil and gas production from horizontal or vertically fracked shale oil wells typically declines 30 percent to 50 percent per month, resulting in a poor percentage of oil/gas actually recovered from the reservoir. A rapid reduction in productivity may also be due to pore throat plugging by asphaltenes and their associated resins, kerogens, and paraffins. Water flooding is typically not feasible for such reservoirs due to very high clay content that results in low permeability combined with the potential to swell the shale clays, thus even further decreasing the reservoir permeability. In addition, the numerous natural or induced fractures of shale promote the bypassing of any injected fluids through the fractures and not into the matrix of the reservoir where the residual oil is present. CO and/or a CO and $CO_2$ mixture are, as a result, beneficial for additional oil recovery. Shale oil has a mixture of aromatic, paraffinic, and asphaltene hydrocarbons, and the moderate solubility of CO in all of these, especially in the aromatics, aid recovery of oil and gas. CO and/or a mixture of $CO_2$/CO has solubility in asphaltenes. This solubility allows mobilization of the asphaltenes away from other long chain hydrocarbons and kerogen, minimizing the effective diameter of the kerogen-long chain paraffin-asphaltene. Reducing the effective diameter by desorbing or liberating the asphaltenes from the long chain hydrocarbons, kerogen, and other sorbed hydrocarbons, results in less blockage of the shale oil pore throats and higher transport of the shale oil to the wellbore.

CO or a mixture of CO and $CO_2$ may achieve an increase in oil recovery during tertiary oil recovery operations due to the ability to achieve oil recovery at lower oil pressures than required by $CO_2$ flooding, minimizing the loss of the introduced gas along fractures. Also, greater infiltration of the CO or CO plus $CO_2$ gas, and other associated gases, from the fractures and into the matrix can occur, thereby accessing additional trapped oil. Successive "Huff-n-Puff" or line-drive injections of the CO or CO mixture continually increase matrix permeability, thereby facilitating further oil recovery.

Thus, according to the present design, selective deployment of CO, CO and $CO_2$, and/or the enumerated gases, beneficially yields enhanced oil production depending on the reservoir and application. Enhanced recovery can be realized in different situations, and the ability to change the composition of gases during recovery can provide benefits.

In general, the present design provides a process and the equipment necessary to produce both carbon monoxide and carbon dioxide and blend the two gases. Hydrogen gas is co-produced in amounts as desired. The components of the system are readily transportable. Two reactor vessels and ancillary separation equipment are provided in addition to, in one embodiment, an air separation unit that provides concentrated oxygen (greater than 85 percent oxygen) to facilitate generation of the gases.

The present design is both "green" and energy efficient. The system recycles all by-products and ultimately sequesters all reaction gases in the reservoir. Greenhouse gas emissions (GHG) are significantly reduced compared to those emitted by current conventional oil production methodologies. The unique gases generated by the equipment are specifically designed to increase the recovery of crude oil and other petroleum products from a reservoir compared to the recoveries found with conventional carbon dioxide oil recovery. The present method of generating carbon monoxide and carbon dioxide can also be employed to produce hydrogen by modifying the fuel inputs. The heat of reaction in the reactor vessels will produce significant electricity, minimizing the need for purchasing electrical power from the grid, and further reducing overall emissions.

System and Method of Implementation—First Embodiment

FIG. 1 illustrates an overview of a first embodiment of the integrated process. From FIG. 1, fuel processing and storage unit 101 includes but is not limited to gaseous fuel measurement and necessary compression, liquid fuel storage, filtration, heating, measurement, and transfer systems and accommodates various types of fuel, including solid, liquid, and/or gas fuels. In one embodiment, fuel processing and storage unit 101 may provide solid fuel storage, sizing of the fuel, drying, and may provide liquid flow or solid conveyance devices to provide the necessary fuel to carbon dioxide generator unit 104 and carbon monoxide generator unit 105. Oxygen generation unit 102 provides enhanced oxygen necessary for controlled oxidation of the carbonaceous fuel to carbon dioxide generator unit 104 and carbon monoxide generator unit 105. Oxygen is delivered in the range of but typically no less than 85 percent purity and ideally in excess of 92 percent purity. This system may produce or provide concentrated oxygen in any reasonable manner desired, such as by using a vacuum pressure adsorption unit (VPSA), a pressure swing adsorption unit (PSA) or by devices providing cryogenic separation functionality. The system releases the inert nitrogen generated by these units into the atmosphere.

Fresh water storage and supply unit 103 provides fresh water for quenching and/or cooling operations, as well as steam generation via a heat exchanger, such as one or more heat exchangers (not shown in FIG. 1) provided in carbon dioxide generator unit 104 and/or carbon monoxide generator unit 105. Fresh water storage and supply unit 103 may include any necessary device or devices used in treating the recycled water for bacteria, pH adjustment, filtration, and other needs. Carbon dioxide generator unit 104 is a vessel that receives carbonaceous fuel with enhanced oxygen and produces predominantly $CO_2$, typically with other gases, such as by stoichiometric reaction or combustion. Recirculation of $CO_2$ from gas conditioning and processing unit 106A controls the heat of this reaction. The system may move hot gas generated to a heat exchanger where circulating fresh water is provided and converted to steam for both power generation purposes and potential feed stock for generating hydrogen.

Carbon monoxide generator unit 105 receives carbonaceous fuel with enhanced oxygen and produces predominantly CO, typically with other gases, using a sub-stoichiometric (partial oxidation, or POX) reaction. As with carbon dioxide generator unit 104, recirculation of $CO_2$ from gas conditioning and processing unit 106A controls the heat of this reaction. Hot gas generated moves to a heat exchanger. The system provides circulating fresh water to the heat exchanger and the heat exchanger converts fresh water to steam for power generation and optionally feed stock to generate hydrogen. By adjusting the fuel feedstock and/or the injection of steam, the system can utilize carbon monoxide generator unit 105 to generate hydrogen in addition to the CO. As shown in FIG. 1, steam may be fed back to carbon monoxide generator unit 105.

In the current embodiment, the two gas-generating units, carbon dioxide generator unit 104 and carbon monoxide generator unit 105, are generally of the same design and construction, allowing for a level of redundancy in the system. By varying the inputs to carbon dioxide generator unit 104 and carbon monoxide generator unit 105, the resultant gases also vary. If one unit is inoperable, the other unit can continue operation by, for example, modifying the fuel and oxygen ratio, thereby producing primarily CO2.

First gas conditioning and process unit 106A receives cooled resultant gases (also called COn rich gases) from carbon dioxide generator unit 104, where the resultant gases are mostly CO2 and received gases are cooled to a sufficient temperature, such as approximately or exactly 300 degrees F. The system includes a quenching system that further cools the $CO_2$ and allows for the water vapor created in the reaction to be removed prior to compression and subsequent blending with CO. Second gas conditioning and process unit 106B also receives cooled gases or COn rich gases, typically cooled to a sufficient temperature such as approximately or exactly 300 degrees F. Cooled gases received are predominantly CO or potentially a significant portion of $H_2$ combined with CO. The cooled gases received may include other reactant gases produced by carbon monoxide generator unit 105. The quench system cools the resultant gases from carbon monoxide generator unit 105 and removes the water vapor created in the reaction prior to any hydrogen separation and subsequent compression and subsequent blending with $CO_2$. If the system produces an appreciable amount of hydrogen, carbon monoxide generator unit 105 may feed the gas produced to a hydrogen PSA (pressure swing adsorption) unit, or other known and/or available hydrogen separating device (a membrane separation device, etc.), to separate the desired hydrogen stream for further processing in hydrogen storage unit 107, with the balance of the gases returned to final gas compression unit 109 for ultimate injection into the petroleum product reservoir.

Hydrogen storage unit 107 receives hydrogen from the second gas conditioning and process unit 106B or whichever unit produces a significant quantity of hydrogen. The system may further process the hydrogen produced as necessary, and the system may compress the hydrogen produced into a bank of high-pressure hydrogen rated tubes, for example, rated for between 5,000 psi and 10,000 psi, or any other appropriate commercially available hydrogen transmission/storage equipment. Final gas compression unit 109 typically comprises a pressurized storage vessel into which the system blends the $CO_2$ gas product generated within carbon dioxide generator unit 104 and the CO gas product generated within carbon monoxide generator unit 105 to create the enhanced oil recovery gas. Also shown in FIG. 1 are the first gas buffer tank 110 and second gas buffer tank 111, which provide gases to gas buffer tank 108 and may recirculate gases back to carbon dioxide generator unit 104 and carbon monoxide generator unit 105 in any desired ratio.

The system may separate oil, water, and gases recovered from the reservoir in conjunction with the enhanced recovery operation, for example, by using conventional separation methods. The system may then treat the recovered gas as necessary and recycle the recycled gas into the storage vessel within final gas compression unit 109. The system may monitor the blended gas for the appropriate constituents and the system may adjust the volumes and composition of the gases generated and provided to the reservoir. The resultant gas mixture may be approximately 60 percent $CO_2$, 25 percent CO and 15 percent other gases, but other ratios may be feasible, such as in the range of plus or minus one, two, five, or ten percent. Gas composition may vary over time. The gas mixture can, for example, range from 50 percent to 75 percent $CO_2$ with 15 percent to 35 percent CO from time to time depending upon operating conditions, the particular reservoir condition, or the desire to increase production of hydrogen. The Trost patents referenced herein provide guidance on limits on injected gas composition. The system may further compress the resultant produced gas provided to the reservoir and may further inject into the petroleum product reservoir at pressures which could range from generally 500 psi to 2,000 psi, plus or minus one, two, five, or ten percent.

Figure 2:
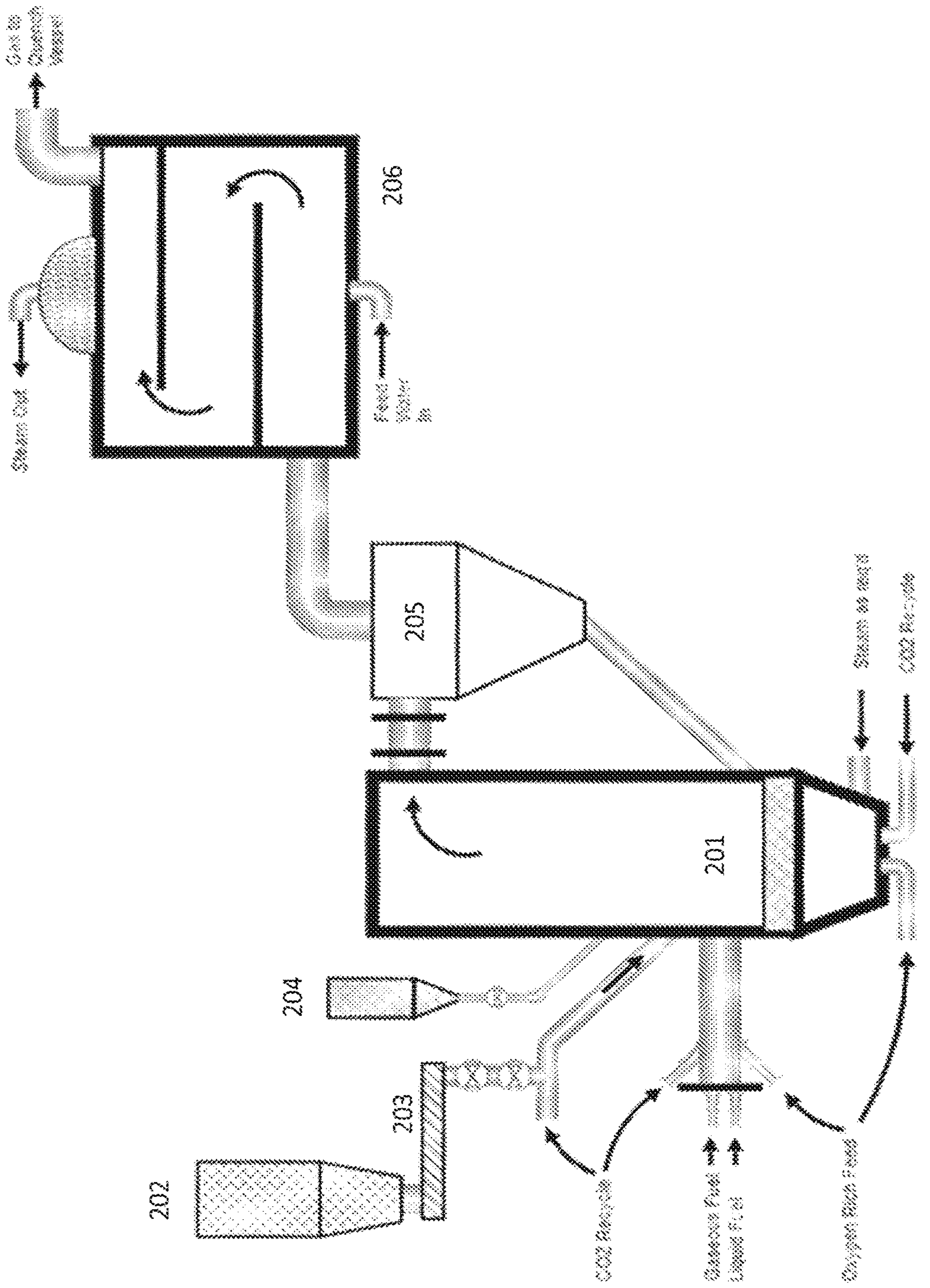
FIG. 2 is a representation of one generator or train of the gas generation portion of the overall integrated process.

FIG. 2 illustrates an overview of an embodiment of one train of the gas generation portion of the overall integrated process. From FIG. 2, bubbling fluidized bed reactor 201 receives materials from various sources and provides gases as a result, and may be used as one or both of carbon dioxide generator unit 104 and carbon monoxide generator unit 105. From FIG. 2, solid fuel bunker 202 provides storage for solid fuel via any reasonable transport mechanism, shown as variable speed screw conveyor 203. Carbon dioxide recycling is provided as shown, and gaseous and/or liquid fuel may be provided as shown. The system may employ one or more fuel sources as appropriate. An oxygen-rich feed is also provided as shown. Bed material container 204 may provide bed material to bubbling fluidized bed reactor 201. Fluidized bed reactor 201 is configured in one embodiment to receive and process fuel in solid, liquid, or gaseous form, such as by causing combustion of the fuel provided. In one embodiment, a fluidized bed reactor may receive enhanced oxygen, i.e., oxygen rather than air, to minimize the nitrogen resulting from the system. Control elements are pictured, i.e., valves or other devices controlling flow, and these may be controlled automatically or manually using a controller (not pictured in this view). A steam line and carbon dioxide recycle line, in addition to an oxygen-rich feed line, are provided at the base of fluidized bed reactor 201. Gas produced is provided to cyclone 205, which in turn has an exit line back to fluidized bed reactor 201 and a separate gas exit line providing gas to scotch marine boiler 206 or a similar type boiler. Scotch marine boiler 206 receives feed water for quenching from below in this embodiment, as well as an output arrangement the yields steam out of scotch marine boiler 206, and an output for gas to a quench vessel, not shown in this view. In this arrangement, $CO_2$ recycled is cooled, mostly $CO_2$ with a small amount of nitrogen and other byproducts generated by the carbon dioxide generation unit 104 and used to cool the reactions in both carbon dioxide generator unit 104 and carbon monoxide generator unit 105.

Figure 3:
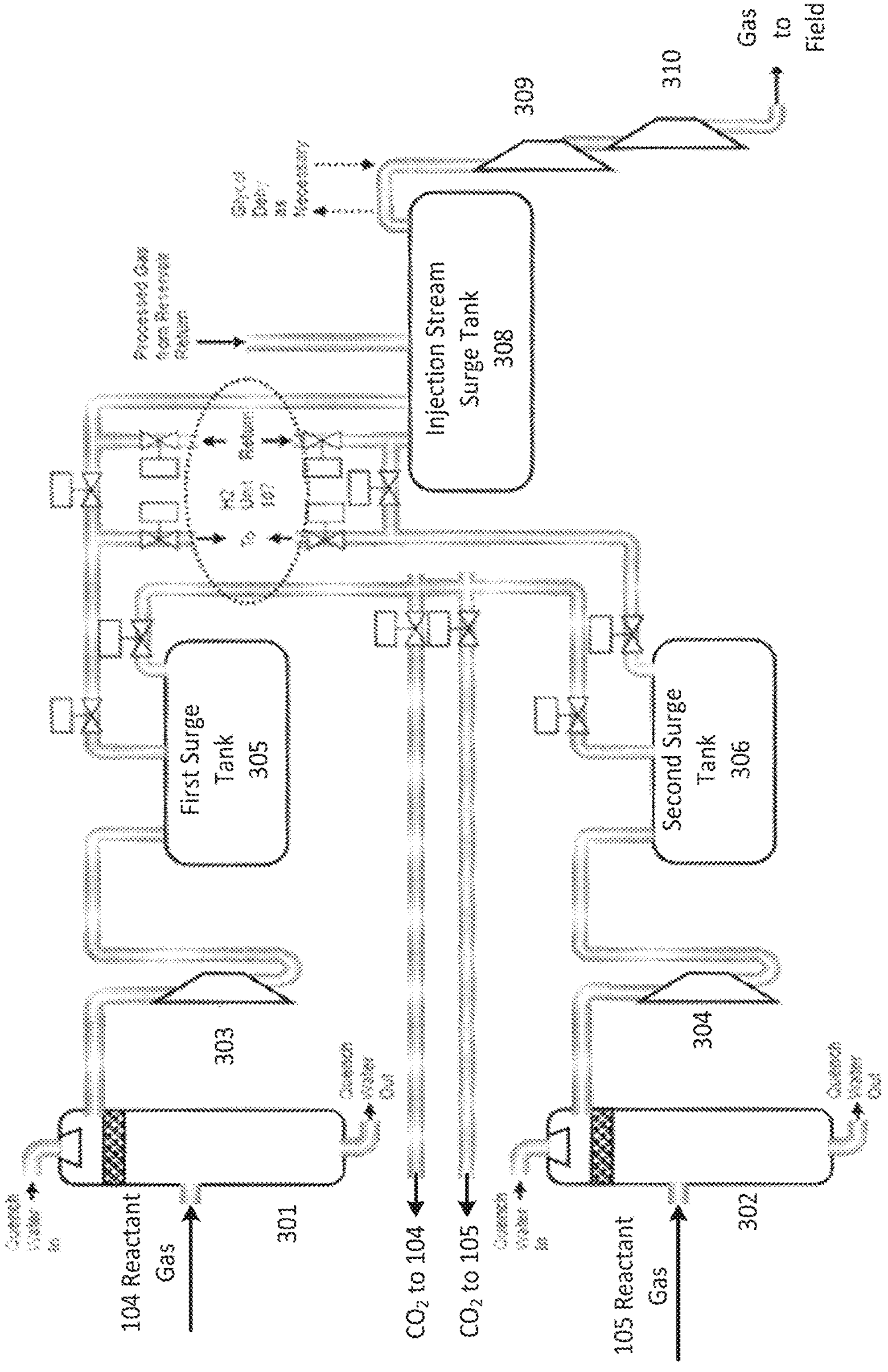
FIG. 3 illustrates an embodiment of the gas conditioning and processing portion of the present design.

FIG. 3 Illustrates an overview of an embodiment of the gas conditioning and processing portion of the overall integrated process. Various control valves are shown in FIG. 3, all controllable automatically or manually by a controller (not shown in this view). First vessel 301 receives quench water in, reactant gas from carbon monoxide generator unit 105, and provides quench water and gas to B compression stage 1 303, which may be a gas compressor. Gas recirculation back to carbon dioxide generator unit 104 and carbon monoxide generator unit 105 may be provided as shown, taking gas from one or both of the first surge tank 305 and/or second surge tank 306. Gas fed back is controlled such that some combination of CO and $CO_2$ may be fed back as desired, from zero to 100 percent of each. Part of the feedback $CO_2$ can be used to fuel the heat of the reaction within the various vessels shown.

Second vessel 302 also receives quench water in reactant gas from carbon dioxide generator unit 104 and provides quench water and gas to compression stage 1 304, which may be a gas compressor. Gas recirculation back to carbon dioxide generator unit 104 and carbon monoxide generator unit 105 may be provided as shown, taking gas from one or both of the first surge tank 305 and/or second surge tank 306.

Hydrogen storage unit 107 is shown in this view, receiving gas from first surge tank 305 and second surge tank 306 and providing the combined gas to injection stream surge tank 308. Hydrogen storage unit 107 may receive gas from one set of pipes or connections and may return or provide gas from another different set of pipes or connections. More or fewer pipes or connections may be employed than is shown in FIG. 3. As shown, injection stream surge tank 308 may receive processed gas from the reservoir. Gas out of injection stream surge tank 308 may pass to stage 2 compressor 309 and stage 3 compressor 310, of which compresses gas as necessary. More or fewer components may be employed here or in any embodiment disclosed herein. Glycol dehydration may be performed as necessary, where in the FIG. 3 embodiment glycol dehydration may be provided in the connection between injection stream surge tank 308 and stage 2 compressor 309. The system provides output from the arrangement, and specifically stage 3 compressor 310 in FIG. 3, to the field or reservoir.

System and Method Implementation—Second Embodiment

Figure 4:
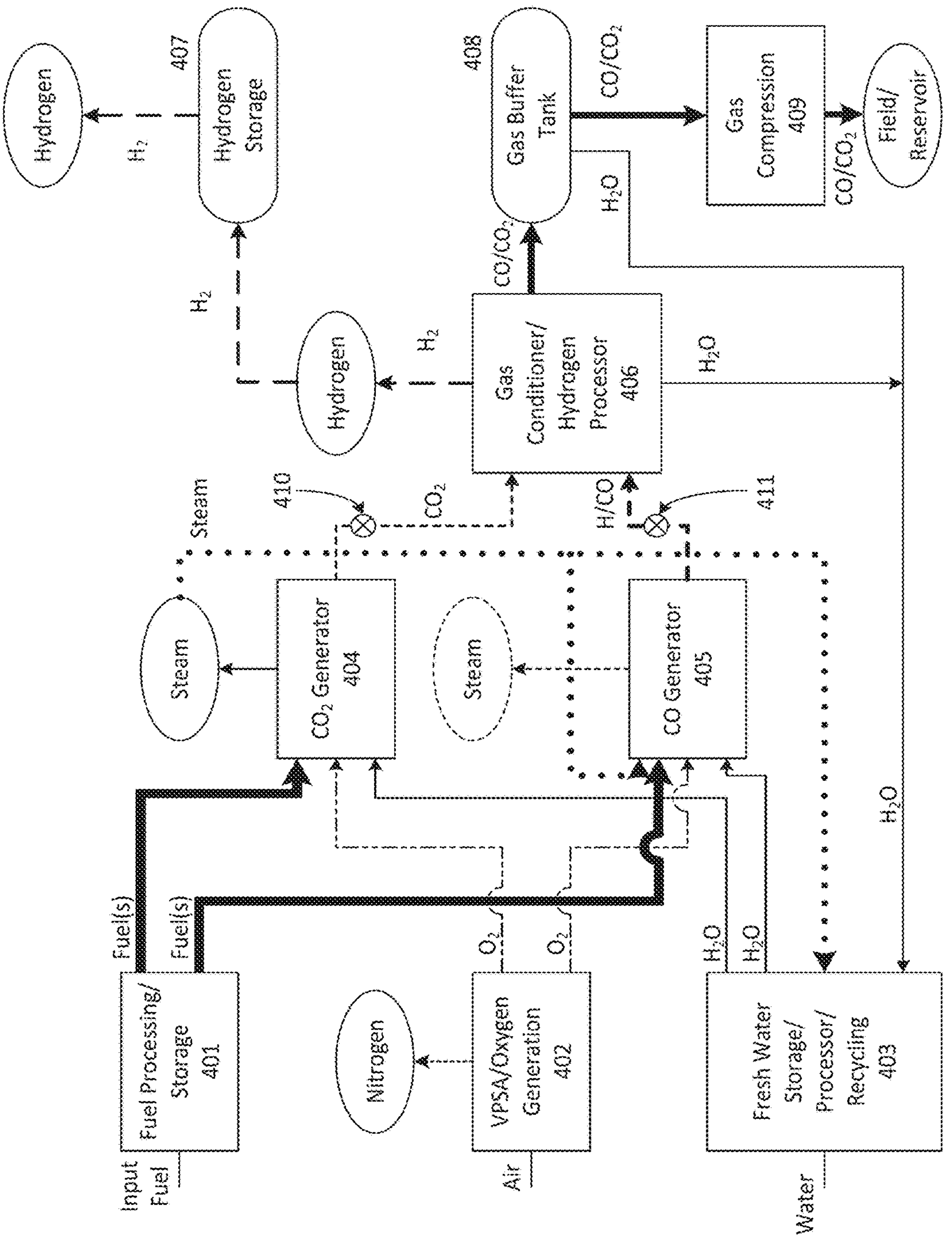
FIG. 4 illustrates an overview of a second embodiment of the present design.

FIG. 4 illustrates a general overview of an on-site implementation according to the present design. Fuel processing and storage element 401 is employed to power CO and $CO_2$ generation. A VPSA (Vacuum Pressure Swing Adsorption) or PSA (Pressure Swing Adsorption) unit 402 receives ambient air and uses appropriate adsorption materials to separate oxygen from the received ambient air. Oxygen is thus generated by VPSA unit 402, preferably at a rate of approximately 90 percent, but more precisely, particularly for carbon dioxide generator 404, at 92±2 percent. Nitrogen is a byproduct of VPSA unit 402. Fresh water storage is provided via freshwater storage element 403, which may be a tank or any type of water storage unit. In most cases, the components of FIG. 4 are transportable, or may be assembled, used, and subsequently disassembled and transported to another location.

Carbon dioxide generator 404 receives fuel, oxygen, and water and produces carbon dioxide. Carbon dioxide generator 404 may employ a water gas shift reaction, using a water gas shift reactor (WGSR) apparatus, wherein carbon monoxide, such as carbon monoxide produced by carbon monoxide and water, are used to produce carbon dioxide and hydrogen:

$$CO+H_2O=>CO_2+H_2 \quad (1)$$

Carbon dioxide produced may be provided to the reservoir, allowing for minimal dispersal of carbon dioxide into the atmosphere. Such an ecologically beneficial arrangement can provide significant benefits.

Such a device for performing WGSR may receive fuel in addition to oxygen and steam in a reactor, use heat within the reactor at heat levels in excess of 1,000 degrees Centigrade, or alternately in excess of 400 degrees Kelvin, and receive from an outlet the carbon dioxide and hydrogen produced. Such a device may employ different types of fuel, including but not limited to coal and biomass fuels. Cooling or quenching may be employed to cool the gases produced.

Figure 7:
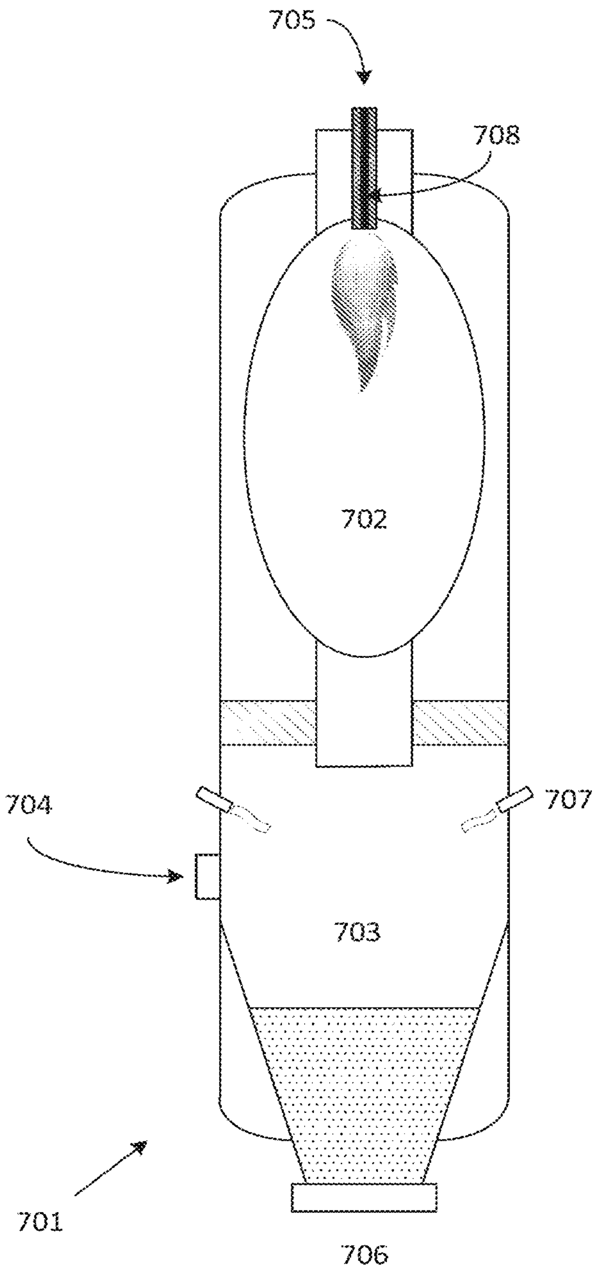
FIG. 7 illustrates an apparatus that may be employed in the present design.

One such device may be employed that applies heat at a higher temperature, such as up to 220 degrees Centigrade. Such a design allows for the use of a wider variety of fuels and for an increase in endothermic reactions. An example design is provided in FIG. 7. In the design of FIG. 7, WGSR apparatus 701 includes reactor 702, quench region 703, gas outlet 704, inlet 705 comprising a burner 708 and configured to receive fuel as well as oxygen combined with steam, with solid/liquid material outlet 706 and quenching elements 707. Multiple quenching elements may be provided, as the intent is to cool the gas from a high temperature, such as 2200 degrees Centigrade, to 180 to 200 degrees Centigrade. The design of FIG. 7 operates at 2 bar or 30 psi, as differentiated from prior designs operating both at lower temperatures and higher pressures. The result is more molecular collisions favoring faster and more complete reactions. The use of higher heat and lower pressure provide for a shorter residence time in the apparatus but necessitates increased quenching. The present design also does not employ a catalyst, as differentiated from previous designs, such as a catalyst generated due to slag resulting from reforming coal. The present design employs a shorter quench period using multiple quench sources to avoid equilibrium and the Boudouard reaction, as well as the reverse WGSR reaction.

Figure 8:
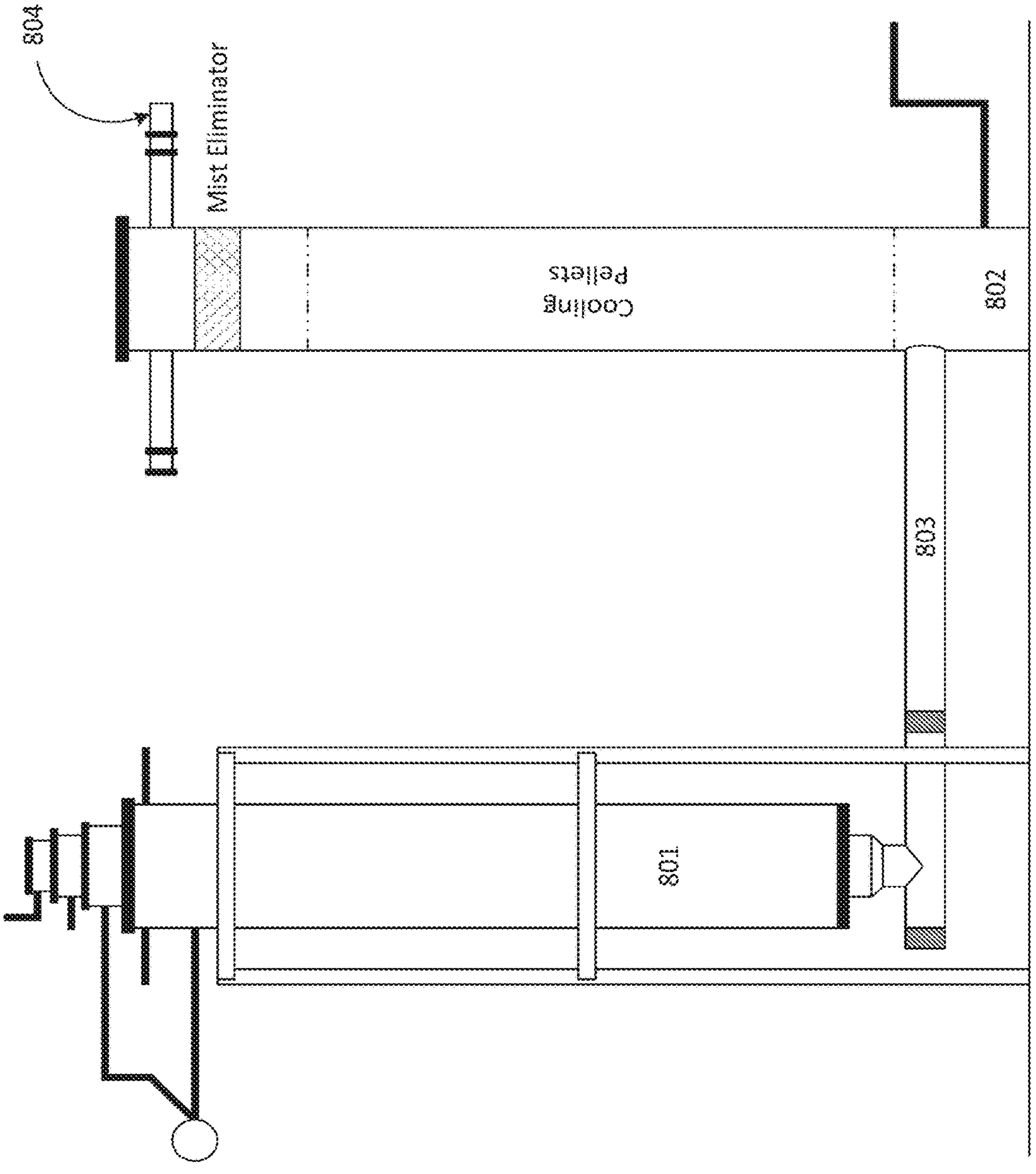
FIG. 8 is an alternate conceptual representation of an apparatus that employs higher temperatures, lower pressure, and enhanced cooling.

An alternate conceptual representation of such a design is presented in FIG. 8. FIG. 8 employs a combustion chamber 801 with a separate cooling tower 802. Cooling tower 802 receives heated gas from combustion chamber 801 via pipe 803 and includes cooling pellets and a mist eliminator to cool the gas received and expel gas via outlet 804 at a temperature of approximately or exactly between 180 and 200 degrees Centigrade. Fuel provided is typically not coal but may take other forms to avoid buildup of slag or other materials.

While it is contemplated that carbon dioxide may be produced by reforming a fuel, such as oil, natural gas, or gasoline, any other device configured to produce carbon dioxide may be employed, such as a device that burns wood or coal. Since heat is produced in addition to carbon dioxide, the heat may be used to heat water or otherwise produce energy that may be used elsewhere within the system, such as to drive pumps or other apparatus. As shown in FIG. 4, a byproduct of the carbon dioxide production process is steam, which comes from carbon dioxide generator 404, that may be used for power generation. Power may be applied to freshwater storage element, for example, to pump fresh water to the various components. Again, carbon dioxide generator 404 may be transportable and able to be assembled and disassembled for positioning at different reservoir locations.

Carbon monoxide generator 405 is a portable device that generates carbon monoxide on-site and may be transported to other locations as desired. As shown in FIG. 4, carbon monoxide generator 405 may produce a combination of hydrogen and carbon monoxide. Various devices and techniques can be employed to produce carbon monoxide. In one arrangement, carbon monoxide may be produced by steam reforming natural gas. Such a device may benefit from the fuel processing and storage element 401 employing natural gas and powering one or both carbon dioxide generator 404 and carbon monoxide generator 405. Further, steam power from components such as carbon dioxide generator 404 can be employed to partially power other components, such as VPSA unit 402 pumping water from water storage unit 403, or even generating carbon monoxide in carbon monoxide generator 405. Extracted petroleum products can be used in certain circumstances to power apparatus illustrated in FIG. 4. Internal connections such as those shown in FIG. 4 and usage of fuels or gases developed or extracted can serve to decrease the overall cost of extraction of oil and natural gas at the site and can be highly beneficial. Such usage can lower the carbon footprint of the petroleum extraction process or can be considered a "green" way of extracting petroleum products.

Carbon monoxide may be produced by, for example, reverse water gas shift reaction (reverse WGSR), wherein:

$$H+CO_2OH+CO \quad (2)$$

Alternately, carbon monoxide may be produced using methane in lieu of other carbonaceous feedstock provided to equipment employing the following equations:

$$CH_4+H_2O \Rightarrow CO+3H_2 \quad (3)$$

$$CH_4+\tfrac{1}{2}O_2 \Rightarrow CO+2H_2 \quad (4)$$

$$CH_4+CO_2 \Rightarrow 2CO+2H_2 \quad (5)$$

Production according to Equation (3) requires relatively thick high strength super alloy tubes to contain the gases exposed to high temperatures and pressures. Production according to Equation (4), known as auto-thermal reforming or partial oxidation, does not require thick super-alloy tubes but can employ, for example, an insulated carbon steel pressure shell. Oxygen can be expensive, as can oxygen separation. Oxygen separation may be accomplished by various means, including cryogenic processing, but most require significant amounts of energy. Certain catalysts may be employed in equipment creating reactions according to Equations (3) through (5).

One methodology for separating oxygen is shown by "High Efficiency Syngas Generation," Robert J. Copeland, et al., TDA Research Inc., February 2005, the entirety of which is incorporated herein by reference. Such a design employs a sorbent that transfers oxygen from the air into a reformer that provides oxygen. The Copeland process reduces oxides to a lower valence state and uses a catalyst to reform natural gas, transferring oxygen from the air to the reformer with minimal energy consumption.

Other methods of generating carbon monoxide may be employed, such as partial or incomplete combustion of carbon materials (partial oxidation reaction), dehydration of formic acid with sulfuric acid, reduction of carbon dioxide over a material such as coke, or by combining carbon with oxygen via reaction at high temperatures.

According to one embodiment, carbon monoxide generator 405 may receive oxygen from VPSA unit 402, water from freshwater storage unit 403, fuel from fuel processing and storage element 401, and steam from carbon dioxide generator 404 to produce carbon monoxide and in some cases, steam as shown in FIG. 1. Production of steam from carbon monoxide generator 405 may or may not occur.

Carbon dioxide and carbon monoxide are provided to gas conditioning and hydrogen compression element 406. Gas conditioning and hydrogen compression element 406 extracts or removes any hydrogen resulting from the production of carbon dioxide and carbon monoxide, which may be provided to a hydrogen storage unit 407, and gas conditioning and hydrogen compression element 406 may balance the amount of carbon dioxide and carbon monoxide output. Carbon monoxide and carbon dioxide may be provided at any combined levels, for zero to 100 percent for each gas. Residual gases may be present in each stream as a result of imperfect production of carbon dioxide and carbon monoxide. However, in general, gas conditioning and hydrogen compression element 406 receives the gas provided by carbon dioxide generator 404 and carbon monoxide generator 405 and selectively provides some or all of such gas at desired proportions to gas buffer tank 408. The system may employ a pump that pumps gas from gas buffer tank 408 to the underground reservoir or region. Gas compressor 409 compresses the received gases and provides the desired mix of gases to the reservoir or region. Gas buffer tank 408 and/or gas conditioning and hydrogen compression element 406 may contain water, and such water may be provided to freshwater storage unit 403, as shown in FIG. 4.

Thus produced from the system shown in FIG. 4 is a selective combination of primarily carbon dioxide and carbon monoxide as well as nitrogen and hydrogen, sometimes termed blue hydrogen, representing hydrogen derived from natural gas using processes such as steam methane reforming. As suggested above, while gases such as carbon dioxide and carbon monoxide may be produced, such gases are typically not completely pure and may contain other elements and/or gases. As used herein, terms such as carbon dioxide and carbon monoxide when discussed as produced quantities, indicate the gas is predominantly made up of that gas. Thus, the term carbon monoxide, for example, when referred to as being produced by the system means a gas composition that is predominantly carbon monoxide but may include other elements and/or gases.

Feedback, or the use of internally developed gases or energy within the system, may occur at various points in the system. As shown in FIG. 4, the combined gases held in gas buffer tank 408 may be fed back, separately from or together with gas from gas conditioning and hydrogen compression element 406 and/or carbon monoxide generator 405. Hydrogen produced and maintained in hydrogen storage unit 407 may be used to power pumps and/or generators or other components shown in FIG. 4. Gas produced and/or oil and gas extracted may be used to power components in the system shown in FIG. 4.

Control may be provided via valves 410 and 411, connected to a controller (not shown in this view) to control amount of gas provided to gas conditioning and hydrogen compression element 406. Such valves or control components may be provided with gas conditioning and hydrogen compression element 406.

Thus, the present design generates a significant percentage of the energy used to power the system, potentially 100 percent, or alternately on the order of 60 or 75 percent in some cases, but typically over 20, 40, or 50 percent in most cases. All gases generated via the equipment and processes disclosed are injected into the reservoir or sequestered and either further processed and sold or sold directly. For example, hydrogen may be produced, sequestered, and either employed or sold. The result is less air pollution and enhanced oil and gas recovery. Sequestration of injected gases below ground results in a decrease in overall carbon dioxide emissions per unit of hydrocarbon produced. In one embodiment, the combined carbon monoxide and carbon dioxide gas can be provided to the reservoir with the reservoir subsequently capped and potentially monitored to minimize or eliminate the risk of dispersal into the atmosphere. Equipment is portable or transportable and can be relocated to other areas and allows for recovery at reservoirs not located in close proximity to a carbon dioxide pipeline, such as a liquid carbon dioxide pipeline. Certain components may be combined. For example, a single unit may house both carbon dioxide generator 404 and carbon monoxide generator 405. The entire arrangement or significant parts of the arrangement of FIG. 1 may be housed in a single unit.

Thus received by the system shown in FIG. 4 is at least one fuel, or possibly multiple fuels, including fuels such as raw natural gas, methane, ethane, propane, lease crude, oil (internally extracted or purchased externally), coal, and/or petroleum coke, and possibly fuels such as coal or wood, as well as ambient air and water. Carbon dioxide and carbon monoxide are produced from the system of FIG. 4 in the ratio desired as well as blue hydrogen and nitrogen, which may be recycled and used within the system as desired.

The net result of employing devices and methodologies according to FIG. 4 is that gases produced thereby are either used to go into the reservoir, are used to power the devices shown, or are maintained and used or sold externally. The net result is a minimal amount of greenhouse gases being provided or emitted to atmosphere, is an amount less than ten percent of all gas produced, and in some situations the minimal amount of gas provided to the atmosphere is less than 8, 5, 2, or even one percent of all gases produced. Greenhouse gases are to be understood in this context to include but not be limited to gases such as CO and $CO_2$. Gases such as $N_2$ and $O_2$ are not considered greenhouse gases in this context. Preferably virtually no greenhouse gases are provided to the atmosphere. In some situations, zero greenhouse gases produced may be released into the atmosphere. As used hereinabove, the term "de minimis" when discussing amount of gases provided means less than one percent of total gases produced by the methods and apparatus disclosed herein. As a result, the present methodology is highly environmentally friendly as compared with previous systems.

Oil fields that have reached their economic limits using previous technologies can in many cases produce additional petroleum products. The present system provides greenhouse gases and/or non-greenhouse gases al varying ratios to pipes and wellheads. Monitoring equipment may be employed to monitor carbon monoxide and carbon dioxide emissions to provide warnings and emergency shutdowns. Carbon monoxide is considered a greenhouse gas in that CO can lead to the production of ozone. However, carbon monoxide rapidly disperses, and as a result, minimal buildup danger of the gas exists.

Figure 5:
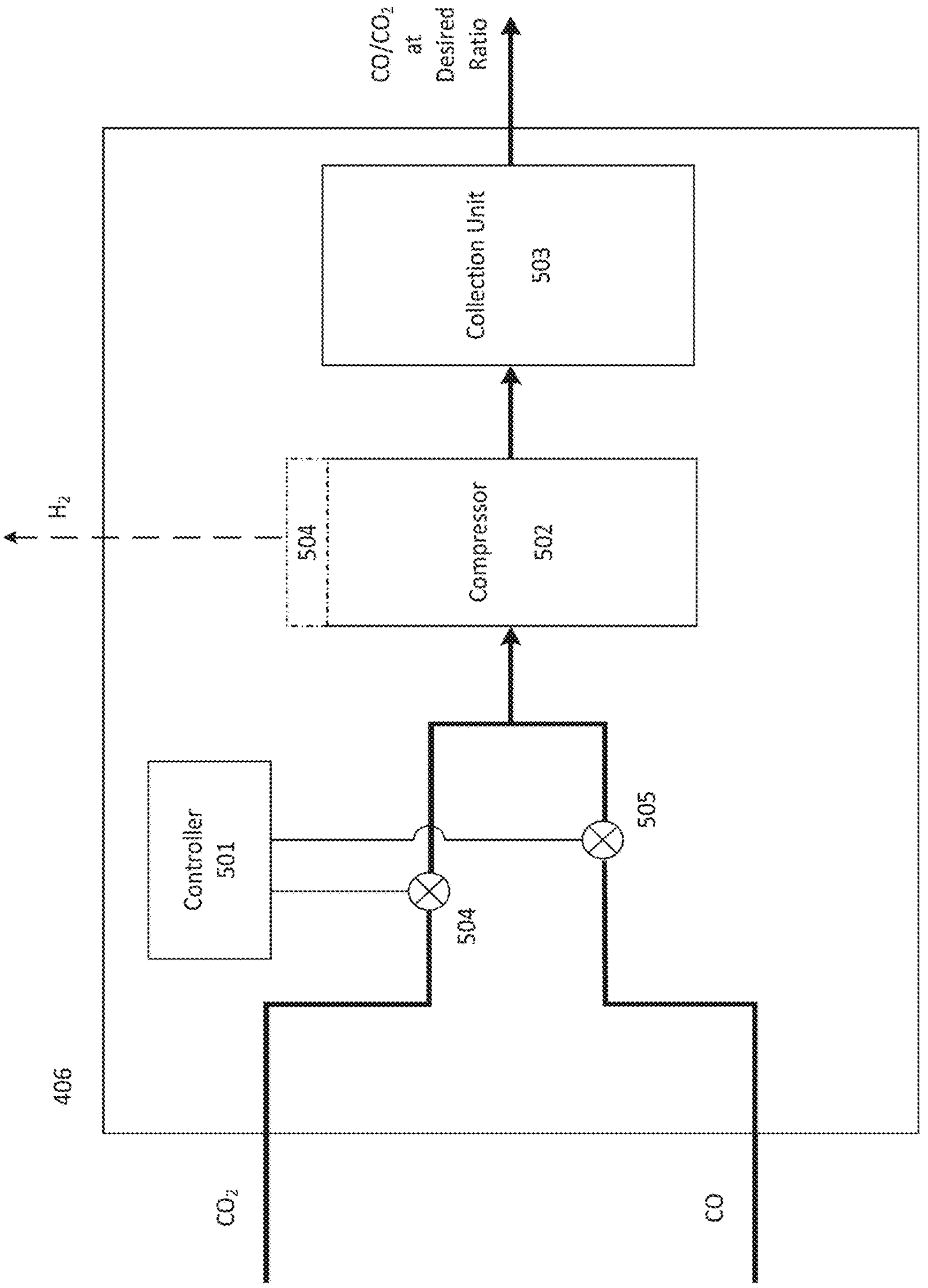
FIG. 5 is a representation of an embodiment of a gas conditioning and hydrogen compressing unit according to the second embodiment of the present design.

FIG. 5 is a general conceptual drawing of one embodiment of a gas conditioning and hydrogen compression element 406. From FIG. 5, carbon dioxide and carbon monoxide gases are received. In this arrangement, controller 501 controls the amount of each gas passed through the system. This differs from and is an alternative to the depiction of valves 410 and 411 in FIG. 4, positioned outside gas conditioning and hydrogen compression element 406. Controller 501 may operate manually, i.e., by an operator setting a desired distribution ratio between gases received, or may be automatic in circumstances where the quality of the reservoir can be determined, such as the makeup of the reservoir rock and the types of conditions encountered. Certain settings may be provided, such as whether primary, secondary, or tertiary recovery is desired, settings of particular types of mineralogy of the reservoir rock being processed (high contents of clay, shale, water, etc.), and the percentage of carbon monoxide versus carbon dioxide may change dynamically, manually or automatically, based on conditions encountered. As an example, if shale is being processed, and a probe or sensor determines a higher quantity of water in a part of the reservoir, processing that part of the reservoir may benefit from a different ratio of carbon dioxide and carbon monoxide.

FIG. 5 illustrates compressor 502, also known as a first stage compressor, which compresses and extracts hydrogen from the resultant gas and collection unit 503. Gas and collection unit 503 may be a buffer tank or other gas collection device, and may be equivalent to or in addition to gas buffer tank 408 shown in FIG. 4. Compressor 502 may compress gas to a desired level, in one embodiment approximately 90 psi. Different components may be provided, and a collection unit, for example, may not be required, with the gas simply collected al an external gas storage tank. Controller 501 controls valves 504 and 505, allowing for a desired ratio of carbon dioxide and carbon monoxide in this embodiment As may be appreciated, if a storage tank is present outside gas conditioning and hydrogen compression element 406 containing a mixture of 100 percent carbon monoxide and 0 percent carbon dioxide, and reservoir.

Thus, the present design in one embodiment may consist of a mixture of $CO_2$ in a range from 1 to 100 percent combined with CO in a range typically from 8 to 100 percent, with the mixture including additional components such as $H_2$, $CH_4$ and/or other hydrocarbons, $H_2O$, and/or $N_2$, in one embodiment with these additional gases totaling in the range of 1 to 25 percent. Separate CO and $CO_2$ production apparatuses, each portable or readily movable, may be provided onsite without access to external CO or $CO_2$ sources, and CO and $CO_2$ produced may be piped to a control device used to control the ratio of gas pumped into the reservoir. Once such gas has been provided and a petroleum product obtained, such as oil and/or gas, the reservoir may be capped, minimizing the amount of gas distributed into the atmosphere, and the reservoir may be monitored for leaks. The result is a green, energy-efficient arrangement that can be used for sequestered reservoirs, i.e., remote reservoirs or fields far from populated areas or areas having limited or no access to electricity, piped fuel, piped gases, and/or other raw materials.

The equipment to produce this combination of gases can include a single vessel, using recycled syngas products, or, alternately, in different vessels each individually producing the $CO_2$ and the CO in combination with, for example, $H_2$ (blue hydrogen). The system can separate and burn or combust $H_2$ or the blue hydrogen extracted may be used to generate electricity. FIG. 5 illustrates extraction element, which may be a membrane or filter or other appropriate device used to facilitate extraction, collection, or removal of hydrogen gas from compressor 502.

Figure 6:
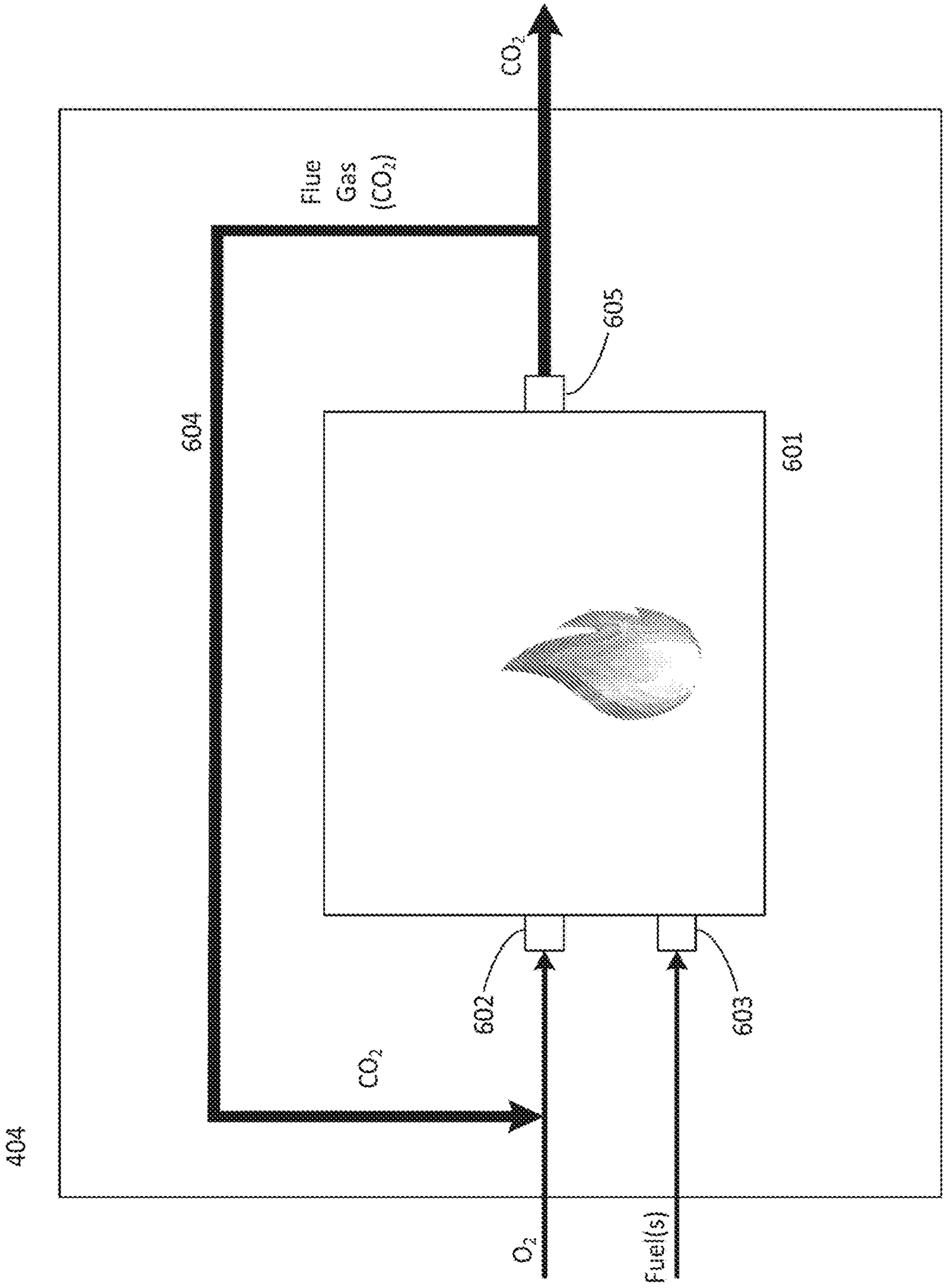
FIG. 6 shows a representation of carbon dioxide generation in an on-site carbon dioxide generating apparatus.

In one embodiment, carbon dioxide may be produced by reforming fuel(s) or other combustible material(s) by pyrolysis in a boiler with a partial recycling of the produced carbon dioxide back into the burner inlet in combination with the reforming of pure oxygen. Such an arrangement is shown in FIG. 6. From FIG. 6, boiler 601 receives oxygen via inlet 602 and fuel(s) in this embodiment via inlet 603. Natural gas may be employed as an example of one fuel used in FIG. 6. Carbon dioxide produced, called flue gas in some instances, is circulated back via connection 604 and is mixed with oxygen as shown. The resultant carbon dioxide exits via output element 605. Combustion in a boiler system allows the recapture of the produced heat from combustion in order to power a steam-driven turbine to, in turn, power a compressor or electrical generator. While shown as oxygen in FIG. 6, oxygen plus air may be received and burned.

Thus, the present design comprises two separate channels of gas, carbon monoxide and carbon dioxide, each separately controllable based on conditions encountered and/or anticipated. Percentages or ratios of the two gases may be controlled dynamically, either manually or automatically. The entire arrangement is transportable to different reservoir locations and fuel, heat, or other produced attributes are used in the system, i.e., fed back or recycled or otherwise utilized in a beneficial manner. The system thus offers the ability to vary gas concentrations passing to the reservoir based on reservoir mineralogy, reservoir permeability variances, and purposes of the injection, such as recovering oil or treating the reservoir to increase matrix permeability, and so forth. The system uses much or all of the heat of combustion to produce energy on-site with minimal emissions. The system transmits emissions from the production of gases into the reservoir according to the present design, or such emissions are sequestered. Such functionality reduces the emissions of greenhouse gases.

Further, the present design does not rely on carbon dioxide or carbon monoxide pipelines, which can be costly and time consuming to set up and use, particularly in smaller oil fields. According to the present design, components are portable or transportable and can be relocated to different oil fields. Further, different types of fuels may be employed in the present design to produce the gases, including but not limited to coal, crude oil, petroleum coke, surplus or otherwise vented or flared gas, casing head gas, natural gas, and/or NGLs (natural gas liquids). The two systems are standalone and can be utilized individually without the other present or online.

Embodiments of the present design separate the production of gases into two separate generators which facilitates the capture of heat for steam or turbine use or power generation. Hydrogen resulting from the process may be captured and sequestered, and either used in extracting petroleum products or sequestering with minimal or no emissions. The end result is a net reduction of carbon dioxide emissions per unit of hydrocarbon production using the present system. Reaction conditions may vary to achieve selected amounts of carbon monoxide and hydrogen. Carbon dioxide and/or carbon monoxide can be generated for small, stranded reservoirs, i.e., petroleum reservoirs far from existing carbon dioxide or carbon monoxide sources. The system shown in the embodiments presented produces carbon dioxide and energy, and carbon dioxide may be used to cool the reactor, such as a CO or $CO_2$ reactor, while simultaneously providing additional carbon monoxide using the reverse water gas shift reaction, such as in the same vessel. The system disclosed in the various embodiments presented herein minimizes local line power needed while simultaneously sequestering the gases produced in the reservoir.

It is to be specifically understood that the various components in the embodiments disclosed and illustrated may be interchanged or used in the other embodiments presented as appropriate, and more or fewer components may be employed while providing the advantages described herein. The present design is not limited in any manner by the embodiments presented. For example, but not by way of limitation, in FIGS. 1 and 4, more than one CO and/or more than one $CO_2$ generator or generator unit may be employed.

The present design produces carbon dioxide by reforming any carbon based or hydrocarbon fuel in the presence of oxygen, such as pure oxygen, and the capture and utilization of the associated heat provides a relatively emission free, or completely emission free, source of electrical energy by injecting all produced gases downhole to aid oil recovery. Produced gas includes carbon dioxide, carbon monoxide, and minor amounts of nitrogen. Carbon monoxide is produced in the current system by, for example, reforming any hydrocarbon fuel in the presence of pure oxygen under a combination of a reformer WGSR combined with a reverse WGSR using the produced carbon dioxide to achieve a higher yield of carbon monoxide. The present system may be used to provide a variable ratio of CO and hydrogen, where hydrogen and CO may be sequestered and/or sold. Carbon dioxide production may be used for reservoirs or oil fields not having access to a carbon dioxide pipeline.

Thus according to one aspect of the present design, there is provided a method for producing carbon dioxide proximate to a petroleum product reservoir, comprising reforming carbon-based fuel within oxygen using a carbon-based fuel reforming apparatus, wherein said reforming produces heat and selectively distributing a desired ratio of carbon dioxide and carbon monoxide to the petroleum product reservoir using electrical energy generated from the heat produced from said reforming. The carbon-based fuel reforming apparatus emits de minimis total greenhouse gases to the atmosphere.

According to another embodiment of the present design, a method for producing carbon dioxide proximate a petroleum product reservoir is provided. The method comprises reforming carbon-based fuel within oxygen using a carbon-based fuel reforming apparatus and using electrical energy generated from heat produced from said reforming to selectively distribute a desired ratio of carbon dioxide and carbon monoxide to the petroleum product reservoir with de minimis total greenhouse gases produced transmitted to the atmosphere.

According to another aspect of the present design, there is provided a method for extracting petroleum products from a petroleum product reservoir, comprising producing carbon monoxide proximate to the petroleum product reservoir, producing carbon dioxide proximate to the petroleum product reservoir, and selectively distributing a desired ratio of carbon dioxide and carbon monoxide dynamically based on current petroleum product reservoir conditions to the petroleum product reservoir.

According to a further aspect of the present design, there is provided a system for extracting petroleum products from a petroleum product reservoir. The system comprises a portable carbon monoxide producing device located proximate to the petroleum product reservoir, a portable carbon dioxide producing device located proximate to the petroleum product reservoir, and a gas collecting device configured to receive carbon dioxide from the carbon dioxide producing device and carbon monoxide from the carbon monoxide producing device and selectively distribute a desired ratio of carbon dioxide and carbon monoxide dynamically based on current petroleum product reservoir conditions to the petroleum product reservoir. The portable carbon dioxide producing device is configured to combust carbon-based fuel within oxygen to produce heat that the system converts to electrical energy and uses to selectively distribute the desired ratio of carbon dioxide and carbon monoxide to the petroleum product reservoir with de minimis greenhouse gases produced transmitted to the atmosphere.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A gas generation method for generating a mixture of a plurality of gases to be distributed in a petroleum product reservoir, the gas generation method comprising:
- providing at least one carbon-based fuel reforming apparatus;
- reforming at least one type of carbon-based fuel with the at least one carbon-based fuel reforming apparatus for generating:
  - a carbon monoxide gas;
  - a carbon dioxide gas; and
  - a hydrogen gas;
- providing a gas conditioning and compression apparatus connected to the at least one carbon-based fuel reforming apparatus;
- processing the carbon dioxide gas and the carbon monoxide gas with the gas conditioning and compression apparatus;
- determining a desired distribution ratio of the carbon dioxide gas and the carbon monoxide gas based on at least one condition associated with the petroleum product reservoir; and
- distributing with a controller, the desired distribution ratio of carbon dioxide and carbon monoxide to the petroleum product reservoir.

2. The gas generation method of claim 1, wherein the at least one carbon-based fuel reforming apparatus comprises:
- a carbon monoxide gas generation unit; and
- a carbon dioxide gas generation unit.

3. The gas generation method of claim 1 and further comprising:
- providing a fuel storage unit connected to at least one carbon-based fuel reforming apparatus, wherein the fuel storage unit is configured to store at least one type of carbon-based fuel;
- providing a vacuum pressure swing adsorption unit connected to at least one carbon-based fuel reforming apparatus;
- generating, with the vacuum pressure swing adsorption unit, oxygen gas from ambient atmosphere;
- providing a freshwater storage unit connected to at least one carbon-based fuel reforming apparatus; and
- receiving oxygen gas, at least one type of fuel, and freshwater by the at least one carbon-based fuel reforming apparatus for generating carbon monoxide gas, carbon dioxide gas, and hydrogen gas.

4. The gas generation method of claim 3, and further comprising:
- reforming at least one type of carbon-based fuel for generating carbon dioxide gas using oxygen gas, at least one type of fuel, and freshwater with a water-gas shift reaction;
- generating steam as a by-product with generating carbon dioxide gas; and
- generating carbon monoxide gas with the steam and carbon dioxide gas with a reverse water-gas shift reaction.

5. The gas generation method of claim 1, wherein processing the carbon monoxide gas and the carbon dioxide gas further comprises:
- compressing the carbon dioxide gas and the carbon monoxide gas up to a predefined pressure;
- extracting hydrogen gas from the mixture of the carbon monoxide gas and the carbon dioxide gas; and
- transmitting the carbon monoxide gas and carbon dioxide gas to a first surge tank and a second surge tank.

6. The gas generation method of claim 5 and further comprising:
- transmitting the hydrogen gas to a hydrogen gas storage unit.

7. The gas generation method of claim 5 and further comprising:
- feeding back a portion of at least one of the carbon monoxide gas and the carbon dioxide gas from the first surge tank and the second surge tank, to the at least one carbon-based fuel reforming apparatus.

8. The gas generation method of claim 1, wherein determining the desired distribution ratio further comprises:
- processing a sample from the petroleum product reservoir for determining the at least one condition; and
- determining the desired distribution ratio of carbon dioxide to the carbon monoxide with the at least one condition.

9. The gas generation method of claim 8, wherein the at least one conditions comprises at least one of:
- minerology of a rock in the petroleum product reservoir, or
- quality of shale in the petroleum product reservoir.

10. The gas generation method of claim 1 and further comprising:

sequestrating the mixture of carbon dioxide gas and the carbon monoxide gas within the petroleum product reservoir.

11. A gas generation system for generation of a mixture of a plurality of gases to be distributed in a petroleum product reservoir, the gas generation system comprising:

at least one carbon-based fuel reforming apparatus to:

reform at least one type of carbon-based fuel with the at least one carbon-based fuel reforming apparatus to generate:

a carbon monoxide gas;

a carbon dioxide gas; and a hydrogen gas;

a gas conditioning and compression apparatus connected to at least one carbon-based fuel reforming apparatus to:

process the carbon dioxide gas and the carbon monoxide gas; and a controller connected to the gas conditioning and compression apparatus, wherein the controller:

determines a desired distribution ratio of the carbon dioxide gas and the carbon monoxide gas based on at least one condition associated with the petroleum product reservoir; and distributes the desired distribution ratio of carbon dioxide and carbon monoxide to the petroleum product reservoir.

12. The gas generation system of claim 11, wherein the at least one carbon-based fuel reforming apparatus comprises:

a carbon monoxide gas generation unit; and a carbon dioxide gas generation unit.

13. The gas generation system of claim 11 and further comprising:

a fuel storage unit connected to at least one carbon-based fuel reforming apparatus, wherein the fuel storage unit is configured to store at least one type of carbon-based fuel;

a vacuum pressure swing adsorption unit connected to at least one carbon-based fuel reforming apparatus to:

generate oxygen gas from ambient atmosphere; and a freshwater storage unit connected to at least one carbon-based fuel reforming apparatus.

14. The gas generation system of claim 13, wherein the at least one carbon-based fuel reforming apparatus generates carbon monoxide gas, carbon dioxide gas, and hydrogen gas with oxygen gas, at least one type of fuel, and freshwater.

15. The gas generation system of claim 13, wherein the at least one carbon-based fuel reforming apparatus is configured to:

reform at least one type of carbon-based fuel with a water-gas shift reaction to generate carbon dioxide gas using oxygen gas, at least one type of fuel, and freshwater;

generate steam as a by-product with the generation of carbon dioxide gas; and generate carbon monoxide gas using steam and carbon dioxide gas with a reverse water-gas shift reaction.

16. The gas generation system of claim 15, wherein the gas conditioning and compression apparatus is configured to:

transmit the hydrogen gas to a hydrogen gas storage unit.

17. The gas generation system of claim 11, wherein the gas conditioning and compression apparatus is configured to:

compress the carbon dioxide gas and the carbon monoxide gas up to a predefined pressure;

extract hydrogen gas from the mixture of the carbon monoxide gas and the carbon dioxide gas; and transmit the carbon monoxide gas and carbon dioxide gas to a first surge tank and a second surge tank.

18. The gas generation system of claim 17, wherein the gas conditioning and compression apparatus is configured to:

feedback a portion of at least one of the carbon monoxide gas and the carbon dioxide gas from the first surge tank and the second surge tank, to the at least one carbon-based fuel reforming apparatus.

19. The gas generation system of claim 11, wherein the controller is configured to:

process a sample from the petroleum product reservoir to determine the at least one condition.

20. The gas generation system of claim 19, wherein the at least one conditions comprises at least one of:

mineralogy of a rock in the petroleum product reservoir, or quality of shale in the petroleum product reservoir.

21. The gas generation system of claim 11, wherein the mixture of carbon dioxide gas and the carbon monoxide gas are sequestered within the petroleum product reservoir.

22. A gas generation method for generating a mixture of a plurality of gases to be distributed in a petroleum product reservoir, the gas generation method comprising:

providing at least one transportable carbon-based fuel reforming apparatus;

reforming carbon-based fuel with oxygen with the at least one transportable carbon-based fuel reforming apparatus for generating:

a carbon monoxide gas;

a carbon dioxide gas; and a hydrogen gas;

providing a gas conditioning and compression apparatus connected to the at least one transportable carbon-based fuel reforming apparatus;

processing the carbon dioxide gas and the carbon monoxide gas with the gas conditioning and compression apparatus;

determining a desired distribution ratio of the carbon dioxide gas and the carbon monoxide gas based on at least one condition associated with the petroleum product reservoir; and distributing with a controller, the desired distribution ratio of carbon dioxide and carbon monoxide to the petroleum product reservoir.

23. The gas generation method of claim 22, wherein the at least one transportable carbon-based fuel reforming apparatus comprises:

a carbon monoxide gas generation unit; and a carbon dioxide gas generation unit.

24. The gas generation method of claim 22 and further comprising:

providing a fuel storage unit connected to at least one carbon-based fuel reforming apparatus, wherein the fuel storage unit is configured to store at least one type of carbon-based fuel;

providing a vacuum pressure swing adsorption unit connected to at least one carbon-based fuel reforming apparatus;

generating, with the vacuum pressure swing adsorption unit, oxygen gas from ambient atmosphere;

providing a freshwater storage unit connected to at least one carbon-based fuel reforming apparatus; and receiving oxygen gas, at least one type of fuel, and freshwater by the at least one transportable carbon-based fuel reforming apparatus for generating carbon monoxide gas, carbon dioxide gas, and hydrogen gas.

25. The gas generation method of claim 24, and further comprising:

reforming at least one type of carbon-based fuel for generating carbon dioxide gas using oxygen gas, at least one type of fuel, and freshwater with a water-gas shift reaction;

generating steam as a by-product with generating carbon dioxide gas; and generating carbon monoxide gas with the steam and carbon dioxide gas with a reverse water-gas shift reaction.

26. The gas generation method of claim 22, wherein processing the carbon monoxide gas and the carbon dioxide gas further comprises:

compressing the carbon dioxide gas and the carbon monoxide gas up to a predefined pressure;

extracting hydrogen gas from the mixture of the carbon monoxide gas and the carbon dioxide gas; and transmitting the carbon monoxide gas and carbon dioxide gas to a first surge tank and a second surge tank.

27. The gas generation method of claim 26 and further comprising:

transmitting the hydrogen gas to a hydrogen gas storage unit.

28. The gas generation method of claim 26 and further comprising:

feeding back a portion of at least one of the carbon monoxide gas and the carbon dioxide gas from the first surge tank and the second surge tank, to the at least one transportable carbon-based fuel reforming apparatus.

29. The gas generation method of claim 26, wherein determining the desired distribution ratio further comprises:

processing a sample from the petroleum product reservoir for determining the at least one condition; and determining the desired distribution ratio of carbon dioxide to the carbon monoxide with the at least one condition.

30. The gas generation method of claim 29, wherein the at least one conditions comprises at least one of:

mineralogy of a rock in the petroleum product reservoir, or quality of shale in the petroleum product reservoir.

31. The gas generation method of claim 22 and further comprising:

sequestrating the mixture of carbon dioxide gas and the carbon monoxide gas within the petroleum product reservoir.

* * * * *